United States Patent [19]

Shaheen et al.

[11] 3,714,707

[45] Feb. 6, 1973

[54] METHOD OF MAKING INTERSTITIAL CONDUCTORS BETWEEN PLATED MEMORY WIRES

[75] Inventors: Joseph M. Shaheen, La Habra; John Simone, Garden Grove, both of Calif.

[73] Assignee: North American Rockwell Corporation

[22] Filed: Sept. 23, 1971

[21] Appl. No.: 182,973

Related U.S. Application Data

[62] Division of Ser. No. 45,677, June 12, 1970, Pat. No. 3,641,520.

[52] U.S. Cl.................29/604, 29/625, 340/174 PW, 340/174 S

[51] Int. Cl.................H01f 7/06

[58] Field of Search.......29/604, 625; 340/174 PW, 174 S, 340/174 VA, 174 MA

[56] References Cited

UNITED STATES PATENTS

| | | | |
|---|---|---|---|
| 3,448,514 | 6/1969 | Reid et al. | 340/174 PW |
| 3,648,362 | 3/1972 | Oshima et al. | 29/604 |
| 3,623,037 | 11/1971 | Parks | 340/174 PW |

*Primary Examiner*—Charles W. Lanham
*Assistant Examiner*—Carl E. Hall
*Attorney*—L. Lee Humphries et al.

[57] ABSTRACT

A copper layer on a dielectric substrate is etched into strips for forming interstitial conductors. Layers of resinous material are placed over the strips for forming channels therebetween. The exposed surface of a dielectric layer clad on one side by a metal layer is placed over the channels to form tunnels for plated memory wires. The outer metal layers of the structure are etched to form word straps orthogonal to the tunnels. The interstitial conductors between the tunnels are interconnected at a common point.

6 Claims, 10 Drawing Figures

INVENTORS
JOSEPH M. SHAHEEN
JOHN SIMONE
BY Martin E Geely
AGENT

INVENTORS
JOSEPH M. SHAHEEN
BY JOHN SIMONE
Martin E. Geery
AGENT

INVENTORS
JOSEPH M. SHAHEEN
JOHN SIMONE
BY Martin E Gerry
AGENT

INVENTORS
JOSEPH M. SHAHEEN
BY JOHN SIMONE
Martin E. Gerry
AGENT

INVENTORS
JOSEPH M. SHAHEEN
BY JOHN SIMONE
Martin E Gerry
AGENT

METHOD OF MAKING INTERSTITIAL CONDUCTORS BETWEEN PLATED MEMORY WIRES

COPENDING PARENT APPLICATION

This is a division of application, Ser. No. 45,677, filed June 12, 1970 now U.S. Pat. No. 3,641,520 issued Feb. 8, 1972.

BACKGROUND OF THE INVENTION

1. Field of the Invention

The invention relates to interstitial conductors between tunnels of a plated wire memory mat and more particularly to interstitial conductors which are covered by insulating layers to form tunnels for plated memory wires.

2. Description of Prior Art

U.S. Pat. No. 3,501,830, issued Mar. 24, 1970 to T. F. Bryzinski et al., for Methods of Making a Filamentary Magnetic Memory Using Flexible Sheet Metal teaches and shows a process for forming channels for accommodating plated memory wires called filaments. In one process, polystyrene is molded into layers for forming a channel structure. Copper clad flexible sheets are formed on the both sides of the polystyrene layers to complete the plated wire memory structure. Filaments are inserted into the channels before the tunnel structure is formed. The filaments are replaced by magnetically coated filaments subsequently. The patent also shows how electrical connections are made to the plated memory wires.

It is pointed out, however, that the patent does not teach or show interstitial conductors between each of the plated memory wires. The process also requires that removable wires (filaments) be inserted into the tunnel structure as the tunnel structure is being formed. A process is preferred in which the tunnels can be formed without the necessity for using removable wires as taught by the patent.

Interstitial conductors are necessary to reduce the electrical field between plated memory wires during the operation of the structure as a plated wire memory. If the electrical interference between wires can be reduced, the plated memory wires can be placed closer together for increasing the density of the plated wire memory.

The present invention is a process for producing a plated wire memory tunnel structure without the necessity for removing wires and for forming interstitial conductors between plates wire memory tunnels. The invention also contemplates the structure which results from the process.

SUMMARY OF THE INVENTION

Briefly, the invention comprises the resulting product and a process for forming interstitial conductors separated by tunnels for plated memory wires by initially forming conducting metal strips between plated wire tunnels of a plated wire memory mat on one surface of a dielectric substrate. Dielectric layers are formed over the conducting metal strips to form channels therebetween. The channels are covered by a second dielectric substrate to form tunnels for accommodating plated memory wires.

Word straps orthogonal to the tunnels are then formed on the outer surfaces of both substrates. The word straps on both surfaces are interconnected to complete an electrical path around the tunnels.

The conducting metal strips comprising the interstitial conductors are interconnected at a common point to provide electrical continuity between all of the interstitial conductors. Plated memory wires are inserted into the tunnels.

The plated memory wires and the word straps may be inserted into an electrical connector for providing power, electrical ground connections, input and output signals. The common connection of the interstitial conductors is connected to electrical ground. In one embodiment, a second plated wire memory mat can be produced and placed in registration with the first mat to increase the capacity of the resulting memory. The mats would be separated by a dielectric substrate. The plated memory wires of both mats would also be connected.

Therefore, it is an object of this invention to provide a process for producing a plated memory mat in which interstitial conductors are formed between tunnels for plated memory wires.

It is another object of this invention to provide a plated memory mat having interstitial conductors formed between tunnels for plated memory wires.

It is another object of this invention to provide a process and a product for reducing an electrical field interference between adjacent plated memory wires.

It is still another object of this invention to provide an improved process and product for increasing the bit density of a plated wire memory.

It is still a further object of this invention to provide a process for forming interstitials between channels for plated memory wires by initially forming conducting metal strips and then forming dielectric layers over the metal strips for producing channels to accommodate plated memory wires.

It is another object of this invention to provide the resulting product and a process for producing a double layered plated wire memory.

These and other objects of this invention will become more apparent when taken in connection with the following description of the invention which includes a brief description of the drawings and a description of the preferred embodiments.

DESCRIPTION OF THE PREFERRED EMBODIMENTS

Figure 1:
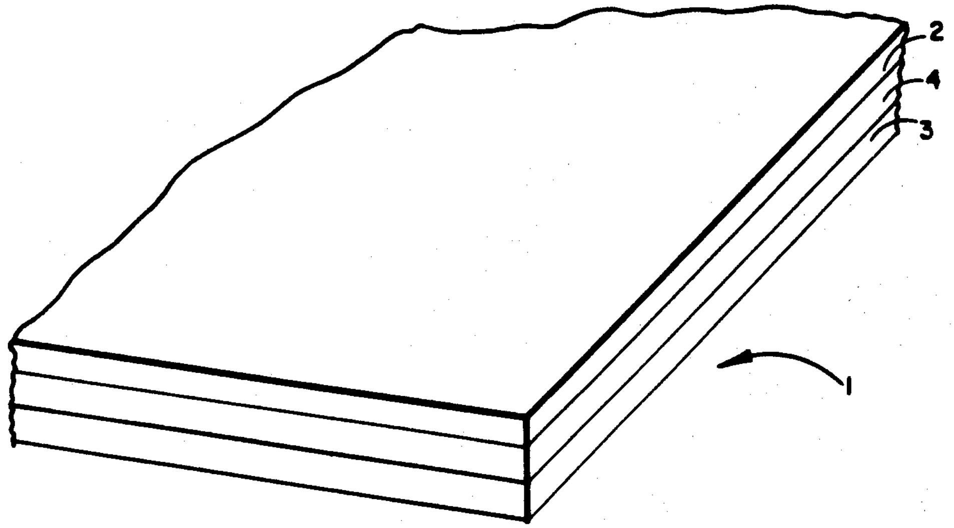
FIG. 1 is a perspective view of a single metal clad dielectric board.

FIG. 1 is a perspective view of a double metal clad dielectric board 1 comprising copper layers 2 and 3 laminated to an epoxy-glass layer 4. As a specific example, the copper layers are one-half inch and the epoxy-glass layer is approximately 0.0025 inches in thickness.

Other metals and dielectric materials can be used in place of copper and epoxy-glass although copper and epoxy-glass are most often used. Nickel on a polyimide layer individually or in combination with an epoxy-glass layer are also usable. As will be indicated subsequently, it is preferred if the dielectric is somewhat flexible. However, the flexibility is not necessary.

Figure 2:
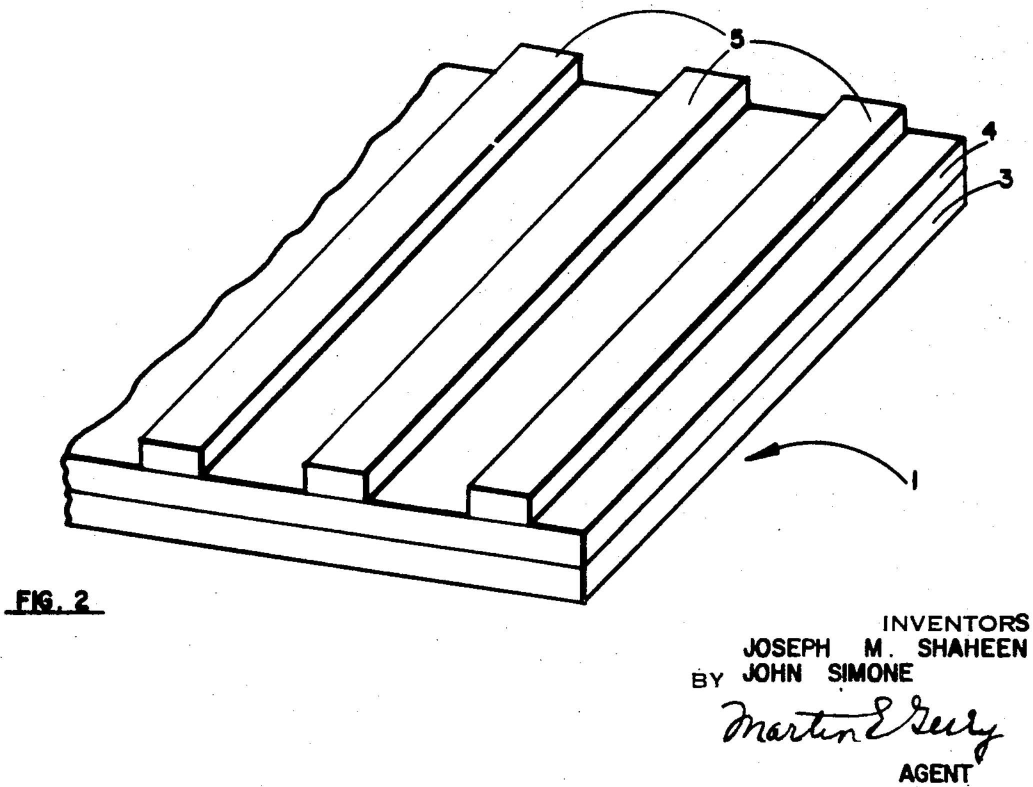
FIG. 2 is a perspective view of the FIG. 1 embodiment showing conducting metal strips etched in the metal layers.

The copper layer 2 is masked and etched into parallel copper strips identified generally by the numeral 5 in FIG. 2. As will be described in more detail subsequently the copper strips become interstitial conductors between plated memory wires. Standard photo resist techniques and etchants such as $FeCl_3$ can be used to form the copper strips on the layer 4.

Figure 3:
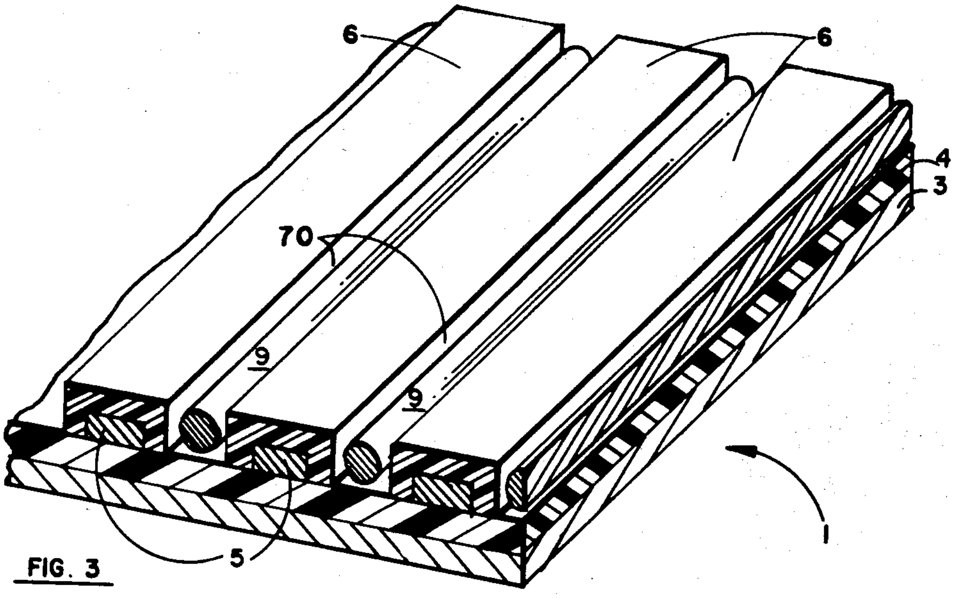
FIG. 3 is a perspective view of the FIG. 2 embodiment showing dielectric layers over the conducting metal strips to form channels and plated memory wires inserted in the channels between the dielectric strips.

In one embodiment, an epoxy resin material is placed in a mold and cast over the copper strips 5 to form resin strips identified generally by the numeral 6 in FIG. 3. The mold is subjected to a temperature and pressure to cause an adherence between the resin and the epoxy-glass substrate 4.

An epoxy resinous material such as polyamide is preferred for forming the strips 6. However, other materials can also be used. For example, epoxy polyols or amine cured epoxies may also be used. The polyamide resin readily adheres to the surface of the epoxy glass layer 4.

The space identified by the numeral 70 between the resin strips 6 become channels 70 for accommodating plated memory wires 9. Although the wires 9 are shown in the channels in FIG. 3, in most embodiments, the wires are inserted during the last step of the process. In one example, the plated memory wires may be described as having a beryllium copper core coated by a layer of nickel-iron alloy. The wire may also be coated in an organic insulating layer, if preferred.

Figure 4:
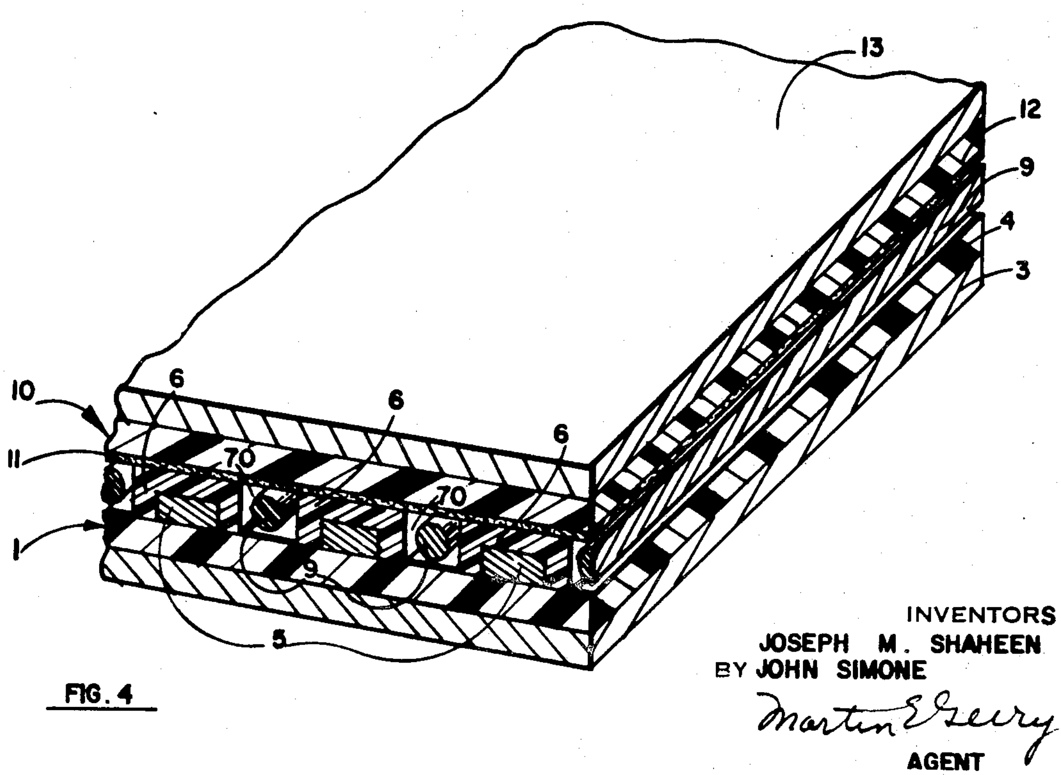
FIG. 4 is a perspective view of the FIG. 3 board showing the channels covered by a single metal clad dielectric board for forming plated wire memory tunnels. The metal layer is on the outside of the single clad board.

Referring to FIG. 4, a single metal clad dielectric board 10 is placed over the top of the FIG. 3 board for sealing channels 70 so that the channels become tunnels 70 for the plated memory wires 9. An adhesive layer 11 is applied to the surface of epoxy-glass layer 12 of board 10. The adhesive layer includes a gelling agent to reduce its flowing characteristics.

An epoxy adhesive or other commercial adhesive may be used on the surface of dielectric layer 12 for achieving adhesion between layer 12 and the top surface of strips 6. A relatively low flow adhesive is preferred in order to prevent contamination of the plated wire memory tunnels. The particular adhesive should be selected in view of the temperatures and pressures to which the board is subjected during the laminating steps of the process. Copper layer 13 is laminated to the outside surface of epoxy-glass layer 12.

After the board 10 has been placed over the channels, the combination of board 10, board 1 and the intervening strips 6 is subjected to heat and pressure for fusing the combination together. Pressures and temperatures necessary to achieve a fusion of the dielectric layers together are known to persons skilled in the art. For example, pressures of 100 psi and temperatures of 350° F may be used to fuse the structure together.

Figure 5:
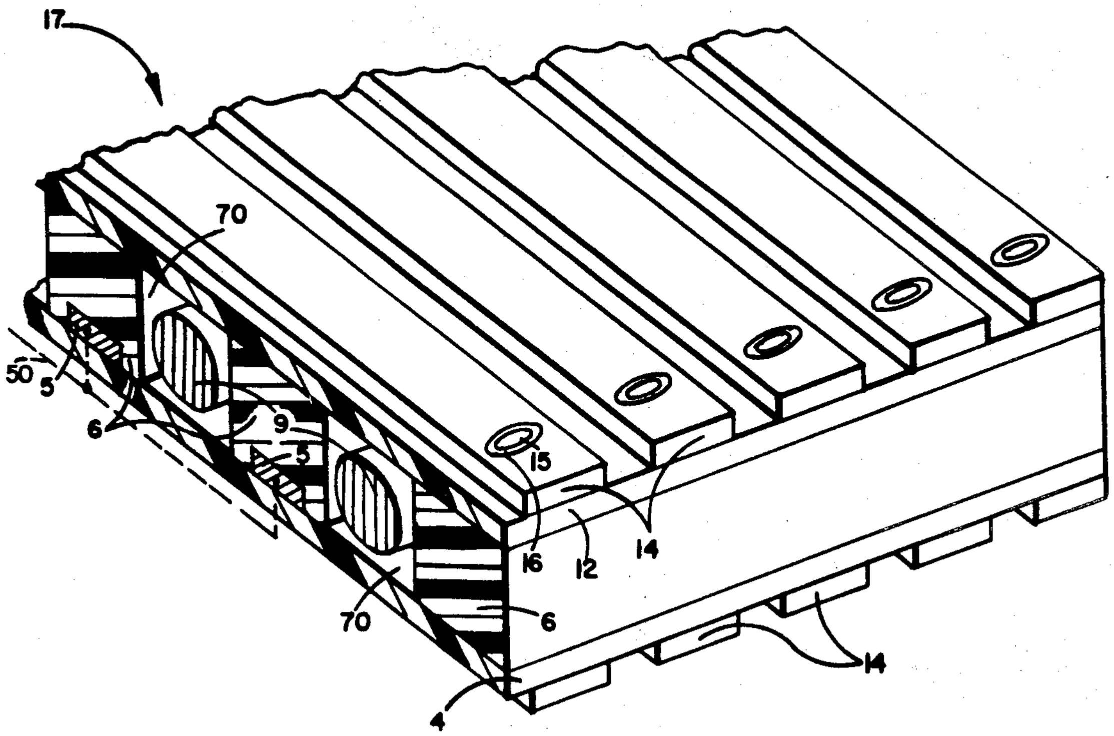
FIG. 5 is a perspective view of the FIG. 4 embodiment showing the other metal layers etched into conducting strips to form word straps for the plated wire memory structure. The word straps are interconnected at one edge of the board by through-hole plating.

Referring to FIG. 5, it is noted that after the boards have been laminated together as shown in FIG. 4, the outside copper layers 3 and 13 of the resulting structure are masked and etched into word straps identified generally by the numeral 14. The word straps 14 are orthogonal to the tunnels for the plated memory wires 9. For convenience the adhesive layer 11 is not shown.

In addition, holes are drilled, either mechanically or chemically, through the word straps on the upper surface of the FIG. 5 structure, layers 12, 6, 4, and the word straps 14 on the bottom surface of the FIG. 5 structure. The holes are plated by well known plating techniques for providing electrical continuity between the word straps. The holes are identified generally by the numeral 15 and the plated layer on the inside of the holes is identified by the numeral 16. The resulting plated wire memory mat is identified by the numeral 17.

It is necessary to electrically connect the word straps at one edge of the FIG. 5 structure in order to complete an electrical path around the plated memory wires 9. It is pointed out that other techniques may be used to electrically connect the word straps. Plated through holes are used to illustrate one example of how the electrical connection can be achieved.

In one embodiment of the invention, the copper strips, or interstitial conductors 5 may also be electrically connected at one edge of the board by plating techniques. The dotted line 50 illustrates a plated interconnection between the interstitials.

Figures 7, 8:
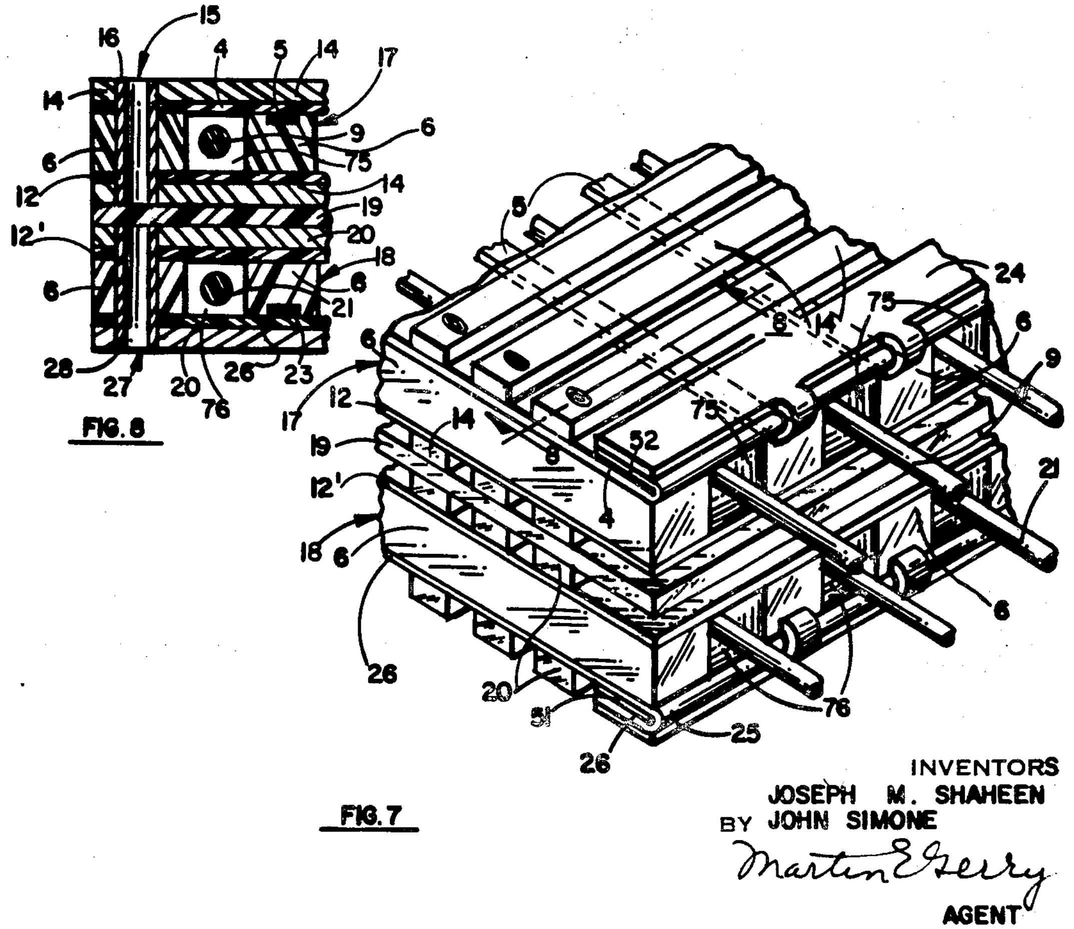
FIG. 7 is a perspective view of an opposite edge of the FIG. 6 plated wire memory showing one embodiment of how the interstitial conductors are interconnected at a common point to form a ground plane for the plated wire memory.
FIG. 8 is a cross-sectional view taken along line 8—8 of the FIG. 7 structure showing one embodiment of how the word straps of the plated wire memory are interconnected by through-hole plating techniques.

For example, when the resin strips 6 were molded over the copper strips 5, a recess could have been provided at one edge of the structure. Subsequently, during the through hole plating process, a conductive layer (illustrated by dotted line 50) could have been plated between the strips 5 for interconnecting the interstitials at a common point. The common point is connected to electrical ground during operation to provide a ground plane for the memory mat 17. For that embodiment, it is necessary that an insulating layer be provided over the plated layer between the strips 5 to prevent electrical contact between plated memory wires and the interconnected interstitials. FIGS. 7 or 8 show the preferred method and structure for interconnecting the copper strips 5.

In one embodiment the epoxy resin strips 6 are molded over the etched copper strips 5. However, in another embodiment, the FIG. 5 plated wire memory mat 17 can be produced by molding or otherwise forming, the epoxy resin strips 6 on the surface of epoxy-glass layer 12. After the strips 6 are fused to the epoxy-glass layer 12, the combination is then placed over the strips 5 and laminated together as indicated above, to produce the same structure as shown in FIG. 5. In other words, the resinous strips 6 can be molded to either board 10 or over the copper strips of board 1. When the two boards are assembled together, the resulting structure appears as shown in FIG. 5.

Figure 6:
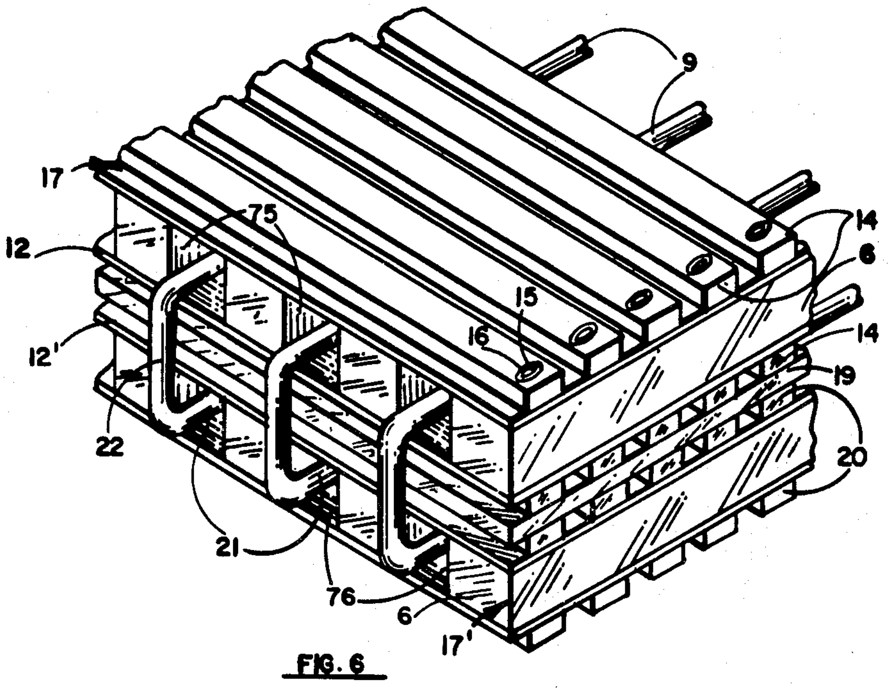
FIG. 6 is a perspective view of the plated wire memory structure showing two of the FIG. 5 plated wire memory mats separated by an insulating substrate and the connection of the plating memory wires by hairpin terminations at one edge of the structure.

Referring to FIG. 6, and notwithstanding that in FIG. 5 plated memory mat 17 can be used, in some cases it is preferred to increase the capacity of the plated wire memory by adding an additional plated wire memory mat 17'. The combination is identified generally by the numeral 51. It is comprised of plated wire memory mat 17 and plated wire memory mat 17', separated by substrate 19. The substrate 19 may be an epoxy-glass layer.

The plated wire memory mat 17' is formed in a manner similar to that indicated for the formation of the FIG. 5 plated wire memory mat 17. The two plated wire memory mats 17 and 17' are placed on the surfaces of substrate 19 so that the word straps 14 and 20 of mats 17 and 17', respectively are in registration. The plated memory wires 9 and 21 of the respective mats are also in registration, and are shown inserted in their respective channels 75 and 76.

The plated memory wires of the mats are interconnected by the hairpin interconnectors 22. The hairpins may be connected to the plated memory wires inside the tunnels by soldering, welding, etc. In the preferred embodiment, the plated wires may be formed in the configuration shown and inserted into the tunnel structure without the necessity for welding the hairpin connectors 22. The interstitials are not shown in the FIG. 6 since in the usual case the resinous material covers the ends of the interstitials on the side of the structure.

After the plated wire memory mats 17 and 17' have been assembled on the substrate 19, the entire assembly is fused together. Heat and pressure are applied so that the structures fuse to each other. A temperature of, for example, 200° F and a pressure of, for example, 100 psi may be used to fuse the structure together. An adhesive layer (not shown) may also be applied to the top surface of the word straps which contact the surfaces of substrate 19. Alternately, the structures may be fused together at room temperature by the use of pressure alone.

Referring to FIGS. 7 and 8, the preferred interconnection of the interstitial conductors 5 of plated wire memory mat 17 and interstitial conductor 23 of plated wire memory mat 18 are shown at common connections. The common connection for mats 17 and 18 are plates 24 and 25, respectively.

As shown in FIGS. 7 and 8, the interstitial conductors 5 for plated wire memory mat 17 and the interstitial conductors 23 for the plated memory wire mat 18 are formed with protruding plate 24 and 25, respectively. The substrates 4 and 26 each have a portion which extends under the plates 24 and 25.

It is preferred if the substrates 4 and 25 are relatively flexible for enabling the extended portions to be easily folded back on top of the outside surfaces of the memory mats 17 and 18, respectively. In order to maintain a relatively planar surface on both sides of the memory, it is preferred if plate 24 and the thickness of the folded portion of substrate 4 are equal to the thickness of the word straps 14. The same characteristics are also preferred for plate 25 and substrate 26 relatively to word straps 20. However, it should be pointed out that the planar characteristics are not necessary. As a result, the plates may be secured to the top surfaces of the plated wire memory without the necessity for folding back a portion of the substrate 4, and similarly for substrate 26.

In addition, the interconnection of the interstitials at the common point represented by the plates may be achieved by electro-deposition techniques without necessity for etching the plates. The folded over technique is used to illustrate one example of a method for interconnecting the interstitials at a common point and for securing that common point to a plate which is usable as a ground plane for the interstitials. The folded portions may be secured to the outer surfaces by an adhesive with or without heat and pressure. The adhesive layers are identified by the numerals 51 and 52.

Figure 9:
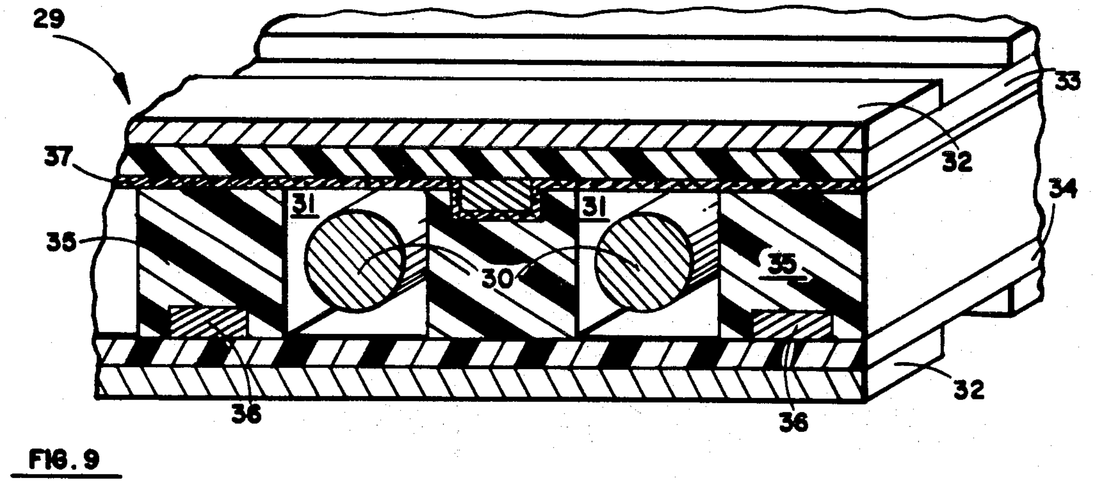
FIG. 9 is a cross-sectional view of a different embodiment of a plated wire memory having staggered interstitial conductors between plated memory wires.
Figure 10:
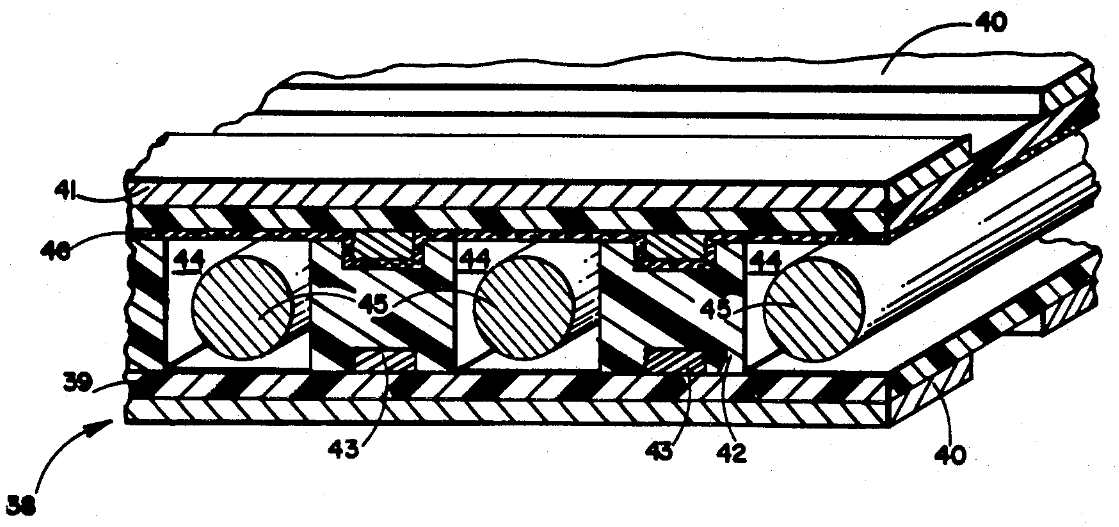
FIG. 10 is a cross-sectional view of another embodiment of a plated wire memory having dual interstitial conductors between plated memory wires.

In operation, the word straps 14 in FIGS. 5 and 6, word straps 14 and 20 in FIGS. 7 and 8, word straps 32 in FIG. 9 and word straps 40 in FIG. 10 receive input and output signals as appropriate for operating the structure as a plated wire memory. The plates 24 and 25 are connected to electrical ground. Ordinarily, the word straps and plated memory wires as well as the plates 24 and 25 are provided with connector terminations which insert into receptacles (not shown). Since such structure is well known to persons skilled in the art the details are not shown in FIG. 7.

FIG. 8 is a cross-sectional view taken along lines 8—8 of the FIG. 7 plated wire memory 18 showing the interconnection of the word straps of both plated wire memory mats. As shown in FIG. 8, plated through hole 15 including plated copper layer 16 interconnects the word straps 14 of plated wire memory mat 17. Substrate 19 is shown separating the two plated wire memory mats. Plated through hole 27 with copper layer 28 interconnects the word straps 20 of plated wire memory mat 18. Plated memory wires 9 and 21 are also shown.

FIG. 9 is an illustration of a different embodiment of the FIG. 5 plated wire memory mat 17. The embodiment is designated by the numeral 29. Plated memory wires 30 are shown in tunnels 31. Word straps 32 on both surfaces of the structure are orthogonal to the plated memory wires 30. The word straps are secured to dielectric substrates 33 and 34. The resinous strips 35 form the walls of the tunnels 31 for housing the plated wires 30. Dielectric or epoxy glass layer 33 has adhesive coating 37 thereon for attaching to the resinous strips 35.

The difference between the FIG. 9 and FIG. 5 structures is the position of the interstitial conductors 36. As indicated by the figure, the interstitials are formed alternately on substrate 33 and on substrate 34 such that every other interstitial conductor is in a different plane. Adhesive layer 37 is shown securing substrate 33 to the tops of resinous strips 35.

FIG. 10 is also a different embodiment of the plated wire memory mat shown in FIG. 5. The FIG. 10 plated memory mat 38 is comprised of lower substrate 39 on which word straps 40 are formed and upper substrate 41 which also includes word straps 40.

Upper substrate 41 is fused to the top surface of resinous strips 42 by the adhesive layer 46. Interstitial conductors are shown disposed on the inner surface of substrate 41 and on the inner surface of substrate 39. As a result, parallel interstitial conductors 43 exist between each of the tunnels 44 for the plated memory wires 45. The process details for forming the FIG. 10 embodiment are substantially the same as the process details described in connection with the previous embodiments.

In operation, information is written into a selected memory bit location along a plated memory wire by passing a current down a selected word strap in coincidence with a bit current being passed down a plated memory wire. The polarity of the bit current determines whether a logic "1" and/or a logic "0" is written at the intersection of the word strap and the plated wire. The interstitials prevent the electrical field in one plated wire from causing information to be written into the adjacent bit portions on either side of the selected plated wire, carried by other adjacent wires.

It would be possible to avoid the interference between plated memory wires by extending the distance between the wires. However, it is preferred to have an increased storage capacity without increasing the size of the plated wire memory. This relatively increases the capacity without the necessity for increasing the size of the plated wire memory mat.

We claim:

1. In a process for providing interstitial conductors in a memory mat for accommodating memory wires in tunnels therein wherein the interstitial conductors are parallel to the tunnels and alternate therewith, wherein metallically clad insulating substrate materials are utilized for making the interstitial conductors and word straps, and wherein insulating covers are provided over at least a portion of each interstitial conductor, the improvement comprising the steps of:

forming a first plurality of electrically conductive parallel metal strips on one face of a first insulating substrate sheet initially clad on both major surfaces with metallic material, said strips comprising the interstitial conductors;

molding a plurality of insulating covers over the exposed surfaces of the first plurality of conductive metal strips, one cover per strip, thereby providing an insulating trough between each pair of adjacently positioned-covered parallel metal strips; and attaching a second insulating substrate sheet metallically clad on one major face thereof to the covers so that the non-metallic face of the second substrate sheet is in cooperation with the covered strips, thereby producing a multiplicity of insulating tunnels in an assembled structure.

2. The invention as stated in claim 1, including the further step of:

removing parallel strips from the metallic layers remaining at the outer surfaces of both substrate sheets of the assembled structure, thereby producing a plurality of metallic straps which are parallel to and insulated from each other and attached to outer surfaces of the substrate sheets and positioned in a direction orthogonal to the direction of the tunnels, the straps on the outer surface of one substrate sheet being in substantial registration with the corresponding straps on the outer surface of the other substrate sheet, on a one-for-one corresponding basis.

3. The invention as stated in claim 2, including the further step of:

interconnecting each of the straps on one of the outer surfaces with its respective corresponding strap on the other of the outer surfaces at one end of the assembled structure.

4. The invention as stated in claim 3, wherein:

the step of interconnecting being accomplished by forming apertures at the interconnection locations through the straps and the assembled structure and plating the internal surfaces of the apertures.

5. The invention as stated in claim 3, including the further steps of:

repeating the steps of forming, molding, attaching, removing and interconnecting thereby producing another assembled structure with interconnected word straps thereon; and joining the structures in a manner where the structures are insulated from each other thereby providing a multiplicity of assembled structures wherein the tunnels of the prior assembled structure are substantially in registration with the tunnels in said another assembled structure, on a one-for-one tunnel basis.

6. The invention as stated in claim 5, wherein:

the steps of interconnecting the straps of each of the structures being accomplished by forming apertures at the interconnection locations through the straps of each of the assembled structures individually and plating the internal surfaces of the apertures of each of the structures individually.

* * * * *